May 28, 1963   J. C. BERLEPSCH, JR., ET AL   3,091,562
MARKING PLASTIC COVERS
Filed Oct. 16, 1958
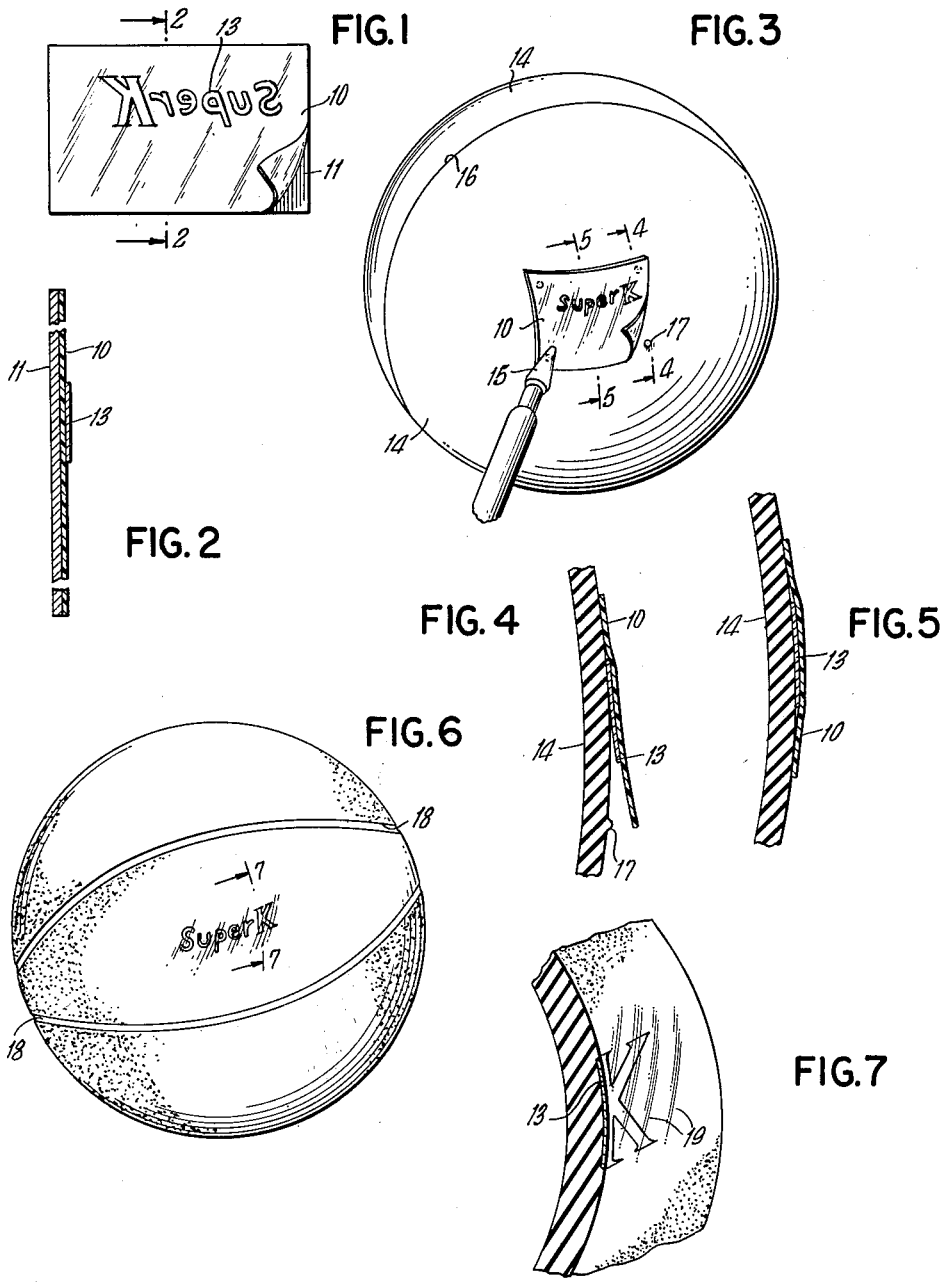
INVENTORS
JOSEPH C. BERLEPSCH, JR.
CORNELIUS J. CROWLEY
BY
ATTORNEYS

United States Patent Office 3,091,562
Patented May 28, 1963

3,091,562
MARKING PLASTIC COVERS
Joseph C. Berlepsch, Jr., Orange, and Cornelius J. Crowley, New Haven, Conn., assignors to The Seamless Rubber Company, New Haven, Conn., a corporation of Connecticut
Filed Oct. 16, 1958, Ser. No. 767,589
5 Claims. (Cl. 156—245)

This invention relates to improvements in marking molded articles made of or covered by a plastic material. The invention, although having general application to various types of articles of manufacture, is particularly suited to athletic equipment subject to rough handling, such as athletic balls.

In the manufacture of athletic equipment, particularly athletic balls which are subject to rough handling, the desired markings are usually printed on the surface by hand, or imposed thereon by stenciling, stamping or decalcomania methods. One obvious problem which is encountered in marking athletic balls by these conventional methods is the difficulty of printing, stenciling or applying decalcomania on the round or curved surfaces thereof. However, a more serious problem is the inability of the markings thus applied to withstand wear. Unless the ink is protected by an engraving, the markings quickly wear off, destroying the general appearance of the ball prematurely. The loss of the markings due to wear may prevent identification of the ball while the ball is still in good condition with a long life expectancy. The manufacturer is thus deprived of the advertising value of the markings, and the consumer is unable to identify the make of the ball. If the markings are placed on the ball cover by stencils, intricate designs are excluded, and there is the danger that many balls will be rendered unmarketable due to mistakes made, such as smearing of the ink.

Engraved markings have a somewhat longer life because they are recessed in the cover of the ball. However, engravings influence the "feel" and often times the performance of the ball. Moreover, the ink is usually placed on the ball in the recesses of the engraving in freehand style, so that there is apt to be a lack of uniformity in the markings on different balls, as well as a danger that many of the balls will be unmarketable due to mistakes or smears which are made in the freehand operation.

The principal object of the present invention is to make possible the embedding of a clearly visible, undistorted marking in the molded cover of an article of manufacture in such fashion that the marking is protected against wear by an undetectable, clear plastic layer overlying the marking.

This object is achieved by the discovery of a novel process in which the marking is produced beforehand in reverse or mirror image on a transparent thermoplastic film. The article or cover therefor, or at least the section thereof which is to receive the marking, is preshaped initially from a mass of thermoplastic resin dispersed in plasticizer by heating the mass in a mold without fully fusing the thermoplastic resin and then cooling the preshaped article or cover. The printed face of the transparent film is then placed in contact with the outer surface of the article to receive the marking, and the article is introduced into a mold which is heated to a temperature above the fusion temperatures of the thermoplastic resins of the film and the cover to produce a mutual blend of the film with the outer surface of the preshaped cover without distorting the marking. The mold is then cooled to solidify the molded article or cover thereof. The marking is thus embedded in the cover and protected by a transparent layer which has substantially the same wear characteristics as the ball. The markings are thus preserved in good appearance over a much longer period of time than has heretofore been thought possible. However, the really surprising result is that the film loses its identity completely, that is to say the protective layer overlying the marking and the outline of the carrier are undetectable even to the scrutinizing eye. In addition, there is no apparent distortion of the marking.

An ancillary, but nevertheless significant feature of the present invention is that the marking is printed or imposed on a thin film entirely separate from the cover. This is of particular advantage when the marking is to be applied to round or curved surfaces of athletic balls, such as footballs, basketballs and the like. Moreover, more intricate markings, including printed matter, trademarks, designs, labels and signatures, are easily printed on a separate film, and if any mistakes appear in the marking or the marking is smeared on the film, only the film need be scrapped.

For a complete understanding of the present invention, reference may be made to the detailed description which follows and to the accompanying drawings, in which:

FIGURE 1 is a face view of the printed film and a support member therefor showing one corner of the carrier turned back;

FIGURE 2 is a cross-sectional view taken along the line 2—2 of FIGURE 1;

FIGURE 3 is a perspective view of an athletic ball prior to final molding, showing the printed film, properly located and temporarily affixed to the outer surface of the cover;

FIGURES 4 and 5 are cross-sectional views taken respectively along the lines 4—4 and 5—5 of FIGURE 3, looking in the direction of the arrows;

FIGURE 6 is a perspective view of a pebbled athletic ball after final molding and marked according to the present invention; and FIGURE 7 is a cross-sectional perspective view taken along the line 7—7 of FIGURE 6, looking in the direction of the arrows.

Although as mentioned above the invention has a more general application, the invention is described herein as applicable to an inflatable ball of the basketball type, and more particularly a ball of the type described in the copending application of Crowley et al., Serial No. 711,415, filed January 27, 1958.

A basketball of this type includes a valve equipped bladder which has fused thereto a fiber reinforced cover bonded to the valve equipped bladder. The cover of the ball is a thermoplastic resin made from a sol containing a vinyl resin dispersed in resilient plasticizer. The plastisol is a dispersion of viscous character that can be applied to the bladder of the ball by forming it into spherical shape in molds at a temperature which permits gelling but not fusing or solidification of the viscous dispersion and later heat treating the gelled composition at a temperature above its fusion temperature.

In one method of manufacturing the inflatable ball, a rubber bladder is inflated and wound with reinforcing threads or fibers. Cotton threads and nylon fibers have been used effectively as the fibrous reinforcement for the ball.

The ball cover is made in sections, preferably hemispherical cup-like sections 14 (see FIGURE 3) in the case of a basketball, by gelling the plastisol in molds, such as by slush molding techniques. The hemispherical cups are fashioned by introducing a plastisol composition in liquid or slurry form into hemispherical metal molds, for example, aluminum molds. The plastisol composition contains a resin, such as polyvinyl chloride resin, in combination with a plasticizer stabilizer, and other ingredients identified in the example below. The characteristics of the plastisol are such that it gels when heated below its temperature of fusion, and it fuses to form a solid mass when heated above its temperature of fusion. The plastisol is heated in an open aluminum mold at an ambient temperature well below the fusion temperature of the plastisol until a shell or coat of gelled material of the desired thickness is formed on the inside surface of the mold. The excess material is then poured out and the molds are further heated, say at a temperature of about 250° F., a temperature well below the fusion temperature, to form gelled hemispheres of the compound. The aluminum molds are then cooled and the respective gelled hemispheres are removed from the mold and trimmed along the edges.

In the steps following the slush molding, a regular engraved ball mold is used, the engraving usually being such as to form pebbling and grooves on the outer surface of the ball. The two gelled hemispherical cups, made in the manner described as above, are placed about a partially inflated bladder wound with fiber reinforcement. Preferably, the hemispherical cups are placed such that their edges are in abutting or overlapping relationship. The assembly is then placed in the engraved mold and heated to a temperature above the fusion temperature of the gelled plastisol, say approximately 350° F. to 360° F. At the same time the bladder is further inflated to allow the fibrous reinforcement to be penetrated or impregnated by the gelled plastisol composition as it softens, thereby fusing the edges of the hemispherical cups together and forming an effective bond between the bladder and the outer cover. The mold is then cooled, causing the material to set, and the ball is deflated and removed from the mold.

An example of the formulation of the plastisol composition together with an acceptable range of the ingredients of the composition is set forth below, the units being by weight:

|  | Example | Range |
| --- | --- | --- |
| Finer particle dispersible polyvinyl chloride resin | 80 | 65-100 |
| Larger particle dispersible polyvinyl chloride resin | 20 | 0-35 |
| Dioctyl phthalate (Plasticizer) | 40 | 20-80 |
| Dioctyl azelate (Plasticizer) | 40 | 20-60 |
| Whiting (filler) | 10 | 0-35 |
| Paraplex G-62 (stabilizer) | 3 | 3-5 |
| Vanstay R (stabilizer) | 3 | 2-3 |
| Vanstay Z (stabilizer) | 1 | 1-2 |
| Pigment | 2 | 0-3 |

The particle size of the polyvinyl chloride resin refers to the size of the particles present in the dispersion when the latter is ready for use, rather than the size of the particles in powder form. In the finger particle resin the particle size is in the range of one micron or less, while in the larger particle resin the particle size is in the order of six microns. The particle size of the resin is a factor in controlling viscosity, the finer particle resin being more viscous than the larger particle resin.

Of great importance is the choice and amount of the plasticizers. The plasticizers used herein are resilient plasticizers. The amount of plasticizer is varied within limits to give a resiliently firm but set vinyl compound fused to the bladder. If too much plasticizer is used the ball cover becomes too soft and has a high rate of cold flow which can result in loss of definition of the pebbling on the ball surface. If, on the other hand, insufficient plasticizer is used the ball lacks the necessary resilience.

Paraplex G-62 is a stabilizing resinous plasticizer produced by Rohm & Haas of Philadelphia, Pennsylvania, and Vanstay R and Vanstay Z are stabilizers produced by the R. T. Vanderbilt Company, New York, N.Y. Paraplex G-60, also a product of Rohm & Haas, can be substituted for Paraplex G-62 as long as less than 5 parts are used to each 100 parts of vinyl. Both Paraplex G-60 and Paraplex G-62 are epoxidized soybean oils. Vanstay R is an organic compound of cadmium and barium 2-ethyl hexoate salt splus organo phosphite ingredients for sequestering metals and containing an anti-oxidant of the phenolic type. Vanstay Z is a compound of zinc 2-ethyl hexoate salts containing organo phosphite ingredients for chelating or sequestering metals and an antioxidant of the phenolic type. Vanstay R is desirable for heat stability of the plastisol. Vanstay Z, when used in conjunction with Vanstay R, inhibits discoloration due to contaminating metals; it also stabilizes against heat and light. The three stabilizers when used together have a synergistic effect.

In a basketball, the thickness of the cover made in the manner described above is preferably within the range of .070 to .080 inch. A ball so made has a cover which is highly resistant to abrasion, is virtually nonporous, does not check on exposure to sunlight, is not affected by oil and resists grease.

In placing printed matter, a trademark, a design, a signature or other marking marking on the ball according to the present invention, the marking is first imposed in reverse or mirror image on a clear or transparent gelled carrier sheet 10 shown in FIGURE 1 of the drawing. The carrier sheet 10 is a clear gelled plastisol composition which may be identical to the composition of the ball cover described above, but without the filler and pigment. The plastisol is spread in a thin film or sheet with a knife spreader upon a support 11 having a release coating thereon, for example, a polyvinyl alcohol or silicone coating. Although a release type paper is preferred, various other materials can be used for the support 11, including metals and plastics; for example, a Mylar sheet can be used. Mylar is a highly durable, transparent, water-repellent film of polyethylene terephthalate resin.

After the plastisol is spread on the release paper it is heated in an oven to produce gelling. During this period it is important that the plastisol is not heated to its fusion temperature which is about 350° F. to 360° F. in the example above. Suitable gelling of the carrier sheet may be accomplished by heating it for twenty minutes at a temperature of approximately 250° F. and thereafter for two hours at 300° F. The gauge of the clear gelled carrier sheet at completion may be in the range of from .008 to .010 inch.

After completion of this process the carrier is ready to receive the marking 13 thereon in reverse or mirror image. Various types of inks may be used in applying the marking 13 on the carrier sheet 10 by various different methods. Very satisfactory results have been obtained using an ink of the same composition as the carrier with the addition of the necessary amount of pigment, and applying the marking thereon by the conventional silk screen process. Alternatively, however, conventional printer's ink can be used and the marking printed directly on the carrier sheet 10. It is apparent that the carrier sheet 10 may be made in large sizes, the markings repeated thereon at suitable spaces and the sheet then cut into individual labels.

The carrier sheet 10 thus marked is stripped from the release paper backing 11 and applied in the manner shown in FIG. 3 to the outer surface of one of the gelled hemispherical covers 14 which has been formed in the manner described above by the slush molding process. As explained above, the hemispherical cover sections 14 shown in FIGURE 3 are in their gelled but unfused state after they have been placed on the fiber wound bladder. The abutting edges of the cover sections or overlapping edge of one of the hemispherical cover sections is indicated by the reference numeral 16. The carrier sheet 10 is temporarily attached, such as by heat sealing the corners with a heating iron 15, to the outer surface of the gelled hemispherical cup or cover. The printed or marked side of the carrier sheet is placed in direct contact with the cover. Thus, a postive image of the marking is visible through the clear carrier sheet.

The location of the marking on the ball is important, particularly in the case of grooved balls, to insure that it is properly oriented and spaced in relation to the grooves. To facilitate properly locating the carrier relative to the cover of the ball, the outer surface of the hemispherical cover 14 may be provided with four small projections 17 indicating where each of the corners of the carrier sheet 10 is to be affixed by heat seals. These projections 17 are formed in the slush molding operation during which the gelled hemispherical cover 14 is formed.

The ball assembly including the carrier sheet is then placed in the engraved mold which is heated in the manner described at a temperature above the fusion temperature of the gelled plastisols of both the carrier sheet 10 and the hemispherical covers 14. In the examples given above, the fusion temperatures of both the compositions are in the range of from 350–360° F. Heating the gelled plastisols at a temperature above their fusion temperatures renders the plastisols fluent, fusing the edges of the hemispheres into an integral one piece solidified ball cover, shown in FIGURE 6 and bonding the cover to the fiber wound bladder. The pebbled outer surface of the ball and the grooves 18 are formed during this operation.

During this molding operation, the carrier sheet 10 becomes an integral part of the ball cover. The marking 13, as shown in FIG. 7 is embedded in the cover of the ball and protected by a protective transparent film 19 which is undetectable due to the fact that the blending of the carrier sheet with the cover of the ball leaves no visible trace or outline. Notwithstanding the loss of identity of the carrier sheet, the marking 13 is clearly identifiable through the protective layer with no apparent distortion. Although it would be expected that the marking would become distorted on heating both the film and pre-shaped cover sections to their fusion temperatures, the inflated bladder prevents lateral flow during the final molding operation, so that there is no distortion of the marking. This layer 19 protects the marking from wear, thus providing a marking having a long life expectancy without in any way detracting from the feel or performance of the ball.

The invention has been shown and described in a single preferred form and by way of example, and obviously many variations and modifications may be made therein without departing from the spirit of the invention. For example, although the present invention has been described in a particular application to an inflatable athletic ball, the invention is also applicable to other molded articles made of or covered by thermoplastic resins. The invention, therefore, is not to be limited to any specified form or embodiment except insofar as such limitations are expressly set forth in the appended claims.

We claim:

1. A process for making an article having a protected marking in the outer cover thereof comprising the steps of preshaping at least a portion of the cover from a mass of thermoplastic resin dispersed in resilient plasticizer by heating the mass in a mold to a temperature high enough to permit preshaping and then cooling the cover, said cover portion being of uniform thickness, forming a relatively transparent film by heating a thermoplastic resin dispersed in plasticizer and then cooling the dispersion in a thin film, printing a marking in mirror image on a surface of the thin film, placing the side of the thin film having the marking printed thereon in face-to-face relationship with the outer surface of the preshaped cover, heating the preshaped cover and the thin film in a mold at the fusion temperature of the thermoplasic resins of both the cover and the film to produce a mutual blend of the film with the outer surface of the preshaped cover while at the same time preventing lateral flow of the fused material within the mold by maintaining the fused material in intimate contact with the mold in order to avoid distorting the marking on the film, and cooling the mold cover to solidify it, thereby to produce a molded product in which the film is an integral part thereof and not discernible to an observer.

2. A process for making an athletic ball cover having a protected marking in the outer surface thereof comprising the steps of preshaping at least a portion of cover from a mass of thermoplastic resin dispersed in resilient plasticizer by heating the mass in a mold without fully fusing the thermoplastic resin and then cooling the preshaped portion of the cover, said cover portion being of uniform thickness, forming a thin, relatively transparent film by heating a thermoplastic resin dispersed in plasticizer, spreading the heated dispersion on the release-coated surface of a sheet and then cooling the thin film, printing a marking in mirror image on the exposed surface of the thin transparent film, stripping the thin film from the sheet, placing the side of the thin film having the marking printed thereon in face-to-face relationship with the outer surface of the preshaped cover, heating the preshaped cover and the thin film in a mold at a temperature high enough to fuse the thermoplastic resins of both the cover and the film and to produce a mutual blend of the film with the outer surface of the preshaped cover while at the same time preventing lateral flow of the fused material within the mold by maintaining the fused material in intimate contact with the mold in order to avoid distorting the marking on the film, and cooling the mass to solidify it, thereby to produce a molded cover in which the film is an integral part thereof and not discernible to an observer.

3. A process for making an athletic ball having a protected marking in the outer surface of the cover comprising the steps of preshaping at least a portion of the cover from a mass of thermoplastic resin dispersed in resilient plasticizer by heating the mass in a mold to a temperature high enough to permit preshaping and then cooling the preshaped portion of the cover, forming a thin, relatively transparent film by heating a thermoplastic resin dispersed in plasticizer to a temperature below the temperature necessary to fuse completely the thermoplastic resin and then cooling the dispersion in a thin film, the total area of the transparent film being less than the overall area of the outer surface of the cover, printing a marking in mirror image on the surface of the thin film, placing the side of the thin film having the marking printed thereon against the outer curved surface of the cover portion and the preshaped cover portions against the outer surface of a bladder, heating the assembly in a mold with the bladder inflated at a temperature high enough to fuse completely the thermoplastic resins of both the cover and the film to produce a mutual blend of the film with the outer surface of the preshaped cover so that the film loses its separate identity without distorting the marking on the film by flow of the thermoplastic resins within the mold, and cooling the cover to solidify it, thereby to produce an athletic ball in which the film is an integral part of the cover and not discernible to an observer.

4. A process as set forth in claim 3 in which the final heating operation is carried out in a mold which imparts a pebbled surface to the cover without distorting the marking.

5. A process as set forth in claim 3 in which the cover is preshaped in a mold containing means therein to form reference points on the preshaped cover portion to facilitate location of the thin film with respect to the cover.

References Cited in the file of this patent

UNITED STATES PATENTS

| 1,052,081 | Miltner | Feb. 4, 1913 |
| 1,212,392 | Palm | Jan. 16, 1917 |
| 1,551,847 | Riley | Sept. 1, 1925 |
| 2,182,053 | Reach | Dec. 5, 1939 |

(Other references on following page)

UNITED STATES PATENTS

| | | | |
|---|---|---|---|
| 2,188,866 | Porschel | Jan. 30, | 1940 |
| 2,300,441 | Voit et al. | Nov. 3, | 1942 |
| 2,309,865 | Reach | Feb. 2, | 1943 |
| 2,330,718 | Kallmann | Sept. 28, | 1943 |
| 2,527,398 | Chavannes | Oct. 24, | 1950 |
| 2,571,962 | Smith et al. | Oct. 16, | 1951 |
| 2,579,294 | Brown | Dec. 18, | 1951 |
| 2,641,562 | Chartrand et al. | June 9, | 1953 |
| 2,646,379 | Porschel | July 21, | 1953 |
| 2,646,380 | Barlow et al. | July 21, | 1953 |
| 2,687,303 | Henderson | Aug. 24, | 1954 |
| 2,797,180 | Baldanza | June 25, | 1957 |
| 2,874,416 | Burnett | Feb. 24, | 1959 |
| 2,874,419 | May et al. | Feb. 24, | 1959 |
| 2,945,693 | Way | July 19, | 1960 |

FOREIGN PATENTS

| | | | |
|---|---|---|---|
| 396,866 | Canada | May 27, | 1941 |
| 1,009,080 | France | Feb. 27, | 1952 |
| 782,249 | Great Britain | Sept. 4, | 1957 |

OTHER REFERENCES

Modern Plastics, "Slush Molding Vinyl Plastisols," October 1950, pages 101–104.